United States Patent
Uchida

(10) Patent No.: US 10,264,172 B2
(45) Date of Patent: Apr. 16, 2019

(54) IMAGE SYSTEM DEVICE

(71) Applicant: Panasonic Intellectual Property Management Co., Ltd., Osaka (JP)

(72) Inventor: Shigeki Uchida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/865,604

(22) Filed: Jan. 9, 2018

(65) Prior Publication Data

US 2018/0131857 A1 May 10, 2018

Related U.S. Application Data

(63) Continuation of application No. PCT/JP2017/017446, filed on May 9, 2017.

(30) Foreign Application Priority Data

Jul. 28, 2016 (JP) .................. 2016-148143

(51) Int. Cl.
*H04N 5/232* (2006.01)
*H04N 5/247* (2006.01)
(Continued)

(52) U.S. Cl.
CPC ......... *H04N 5/23203* (2013.01); *G03B 35/08* (2013.01); *G06F 12/00* (2013.01);
(Continued)

(58) Field of Classification Search
CPC ........... G06T 2207/30221–2207/30236; G06K 9/00771–9/00778;
(Continued)

(56) References Cited

U.S. PATENT DOCUMENTS

2004/0125148 A1* 7/2004 Pea .................... H04N 5/23238
715/802
2010/0182439 A1* 7/2010 Morita ................... H04N 5/765
348/207.11
(Continued)

FOREIGN PATENT DOCUMENTS

| JP | 2002-007307 A | 1/2002 |
|---|---|---|
| JP | 2004-173152 A | 6/2004 |
| JP | 2015-186145 A | 10/2015 |

OTHER PUBLICATIONS

International Search Report for corresponding International Application No. PCT/JP2017/017446 dated Jul. 18, 2017.

*Primary Examiner* — Xi Wang
(74) *Attorney, Agent, or Firm* — Renner Otto Boisselle & Sklar, LLP

(57) ABSTRACT

Provided is an image system device comprising: a plurality of imaging units that captures a specific subject from different directions; a shooting signal transmitter that transmits, to the plurality of imaging units, a shooting signal for controlling a capturing timing of the plurality of imaging units; and a host that acquires location information indicating a physical location of each of the plurality of imaging units, and when receiving an image from each of the plurality of imaging units, stores the image with a file name based on the location information corresponding to each of the imaging units from which the image is received.

3 Claims, 12 Drawing Sheets

(51) Int. Cl.
*H04N 5/77* (2006.01)
*H04N 9/804* (2006.01)
*G06F 12/00* (2006.01)
*G03B 35/08* (2006.01)

(52) U.S. Cl.
CPC ............. *H04N 5/232* (2013.01); *H04N 5/247* (2013.01); *H04N 5/77* (2013.01); *H04N 9/8042* (2013.01)

(58) Field of Classification Search
CPC ........... G08B 13/196–13/19697; H04N 5/247; H04N 5/2252; H04N 5/23216; H04N 5/3415; H04N 5/2353; H04N 5/23238
USPC ....................... 348/297; 396/63–70, 213–262
See application file for complete search history.

(56) References Cited

U.S. PATENT DOCUMENTS

2011/0313972 A1* 12/2011 Albouze ........... G06F 17/30174
707/624
2015/0306824 A1* 10/2015 Flores Mangas ...... G05B 15/02
700/98

* cited by examiner

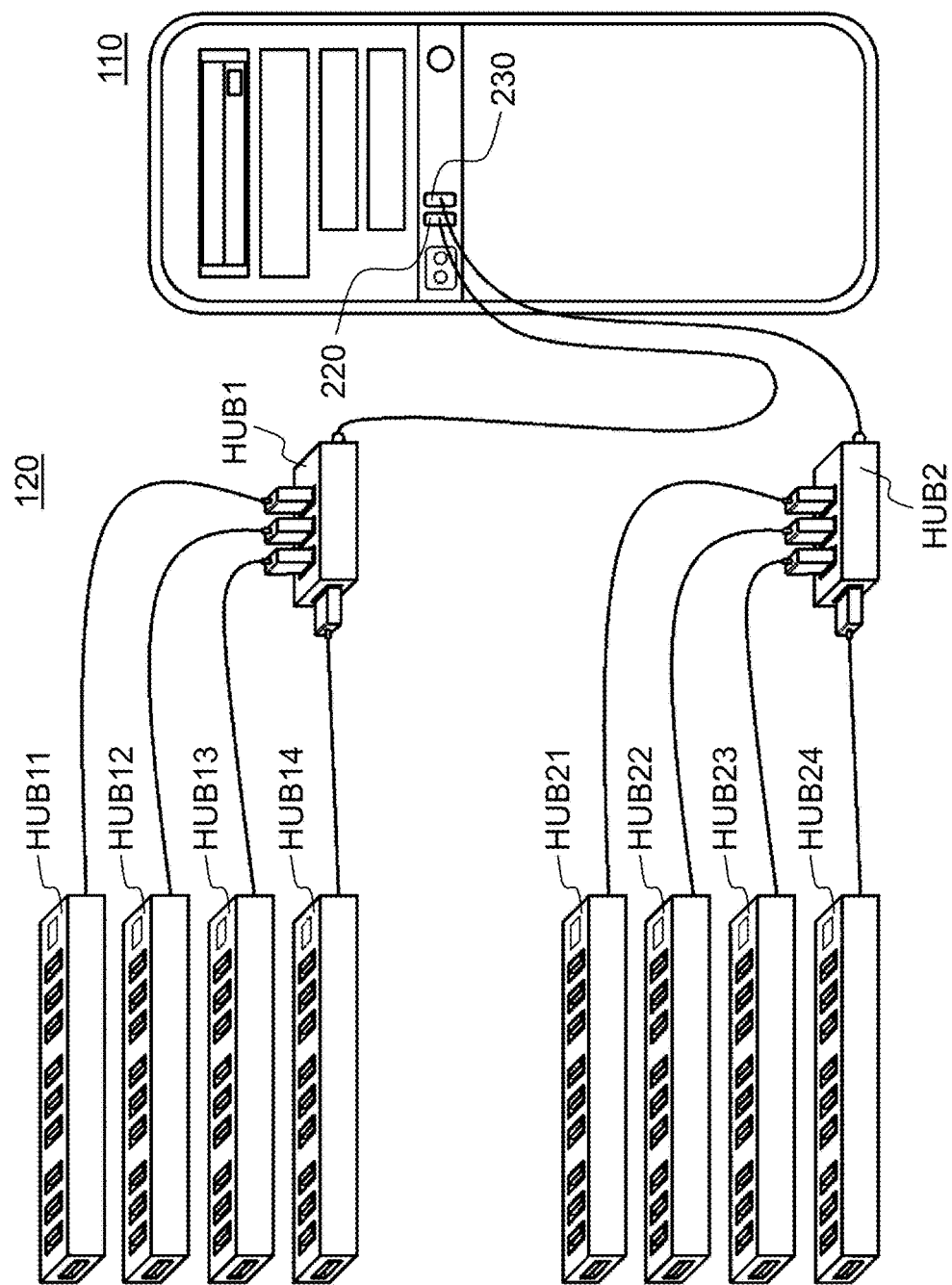

|     | 1-1 | 1-2 | 1-3 | 2-1 | 2-2 | 2-3 |
|-----|-----|-----|-----|-----|-----|-----|
| 200 | ○   | ○   | ○   | ○   | ○   | ○   |
| 300 | ○   | ○   | ○   | ○   | ○   | ○   |
| 100 | ○   | ○   | ○   | ○   | ○   | ○   |
| 420 | ○   | ○   | ○   | ○   | ○   | ○   |
| 430 | ○   | ○   | ○   | ○   | ○   | ○   |
| 410 | ○   | ○   | ○   | ○   | ○   | ○   |

IMAGE SYSTEM DEVICE

BACKGROUND

1. Technical Field

The present disclosure relates to an image system device that captures a specific subject from various directions by a plurality of imaging units.

2. Description of the Related Art

Unexamined Japanese Patent Publication No. 2002-7307 discloses a device control system that connects a same device to different hierarchies to provide different functions thereto. In this device control system, multiple hubs are cascade-connected to a route hub to form multiple hierarchized ports. In this device control system, only one device is connected to each hierarchy, so that the ports are distinguished from one another and recognized according to the difference in the hierarchies. Thus, different functions can be provided to each device connected to each port.

SUMMARY

The image system device according to the present disclosure includes: a plurality of imaging units that captures a specific subject from different directions; a shooting signal transmitter that transmits, to the plurality of imaging units, a shooting signal for controlling a capturing timing of the plurality of imaging units; and a host that acquires location information indicating a physical location of each of the plurality of imaging units, and when receiving an image from each of the plurality of imaging units, stores the image with a file name based on the location information corresponding to each of the imaging units from which the image is received.

The image system device according to the present disclosure can easily specify a correspondence relation between a captured image and a digital camera.

BRIEF DESCRIPTION OF THE DRAWINGS

FIG. 2 is a schematic diagram illustrating a connection configuration between a host personal computer (PC) and universal serial bus (USB) hubs according to the first exemplary embodiment;

DETAILED DESCRIPTION

Hereinafter, exemplary embodiments will be described in detail with reference to the drawings as appropriate. However, descriptions in more detail than necessary may be omitted. For example, a detailed description of a matter which is already well-known and a repeated description for a substantially identical configuration may be omitted. This is to avoid unnecessary redundancy of the following description and facilitate the understanding of those skilled in the art.

Note that the attached drawings and the following description are provided for those skilled in the art to fully understand the present disclosure, and are not intended to limit the subject matter as described in the appended claims.

First Exemplary Embodiment

A first exemplary embodiment will now be described herein with reference to FIGS. 1A to 11.

[1-1. Configuration]

[1-1-1. Configuration of Image System Device]

Figure 1A:
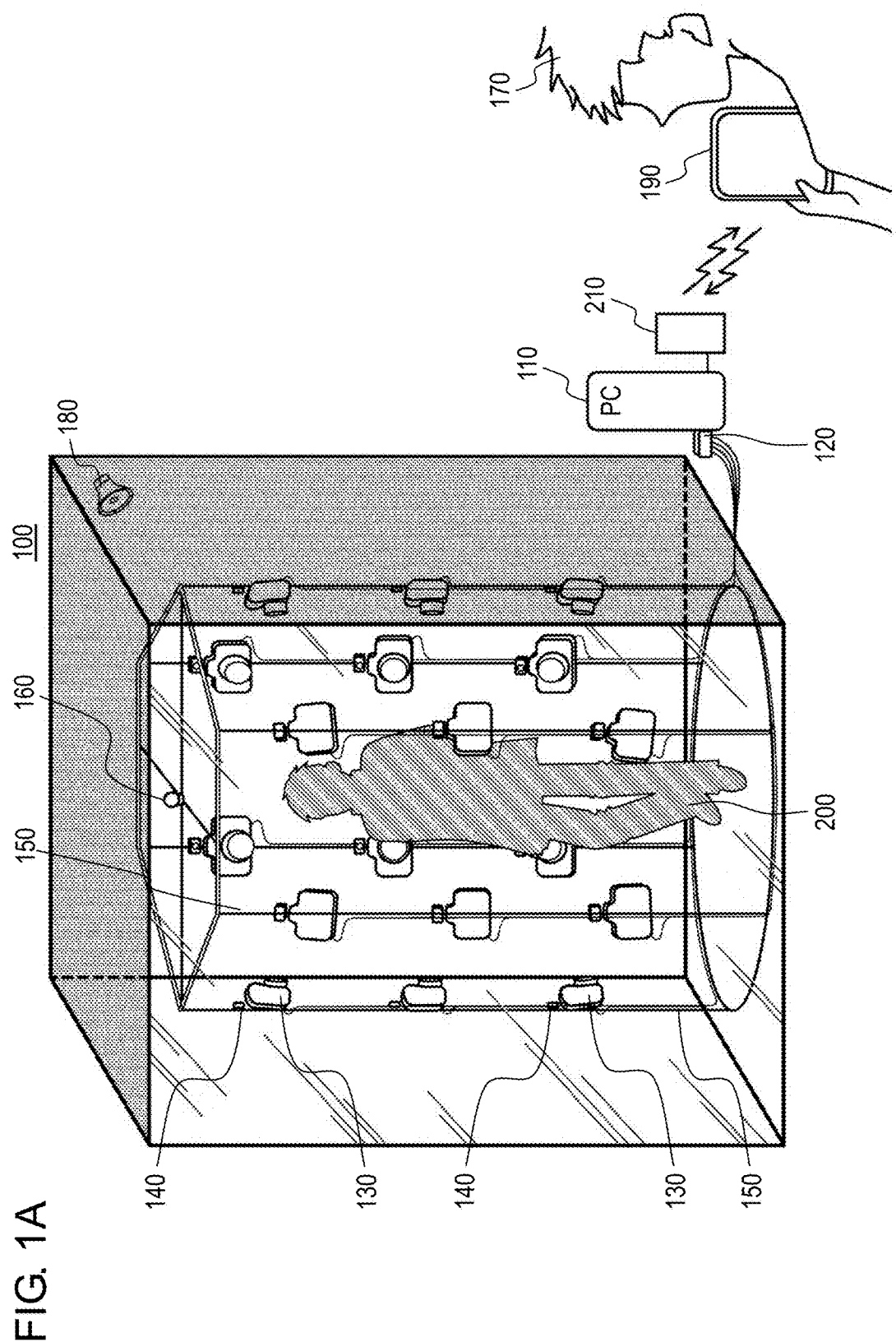
FIG. 1A is a schematic view illustrating a configuration of an image system device according to a first exemplary embodiment.

FIG. 1A is a schematic view illustrating a configuration of image system device 100 according to the first exemplary embodiment. Image system device 100 is composed of host personal computer (PC) 110 serving as a host to control a system, universal serial bus (USB) hub 120 and wireless router 210 which are connected to host PC 110, a plurality of digital cameras 130 connected to USB hub 120, and a plurality of lamps 140 located near respective digital cameras 130. Image system device 100 also includes a plurality of frames 150 for supporting digital cameras 130 and lamps 140, flash lamp 160 mounted on a beam on top surfaces of frames 150, speaker 180 that transmits a voice from operator 170 or the like, and tablet terminal 190 operated by operator 170. Subject 200 is disposed at the center of image system device 100 and captured by digital cameras 130.

Host PC 110 functions as a Web server. Operator 170 using tablet terminal 190 can access to host PC 110 by a Web browser on tablet terminal 190. Thus, operator 170 can control image system device 100 through tablet terminal 190. In the first exemplary embodiment, host PC 110 functions as a location information acquisition unit, and acquires location information of respective digital cameras 130 in association with address information of USB hub 120 to which respective digital cameras 130 are connected. The location information indicates a physical location of each digital camera 130, and in the first exemplary embodiment, it is information obtained by associating identification information of each digital camera 130 with the physical location of corresponding digital camera 130. The address information means electronic connection information (hierarchy information and port number information of USB hub 120) between respective digital cameras 130 and USB hub 120, and it is expressed by a hierarchy structure. Host PC 110 acquires, from each digital camera 130, a captured image (image) captured by digital camera 130 together with identification information thereof. Host PC 110 specifies the location information of digital camera 130 that captures the captured image based on the identification information of digital camera 130 associated with the captured image or the address information of a path of capturing the image. Then, host PC 110 gives a file name based on the specified location information to the captured image, and stores the resultant captured image. After receiving captured images from respective digital cameras 130, host PC 110 generates three-dimensional (3D) model data of subject 200 from these captured images.

USB hub 120 functions as a hub for connecting host PC 110 to digital cameras 130 (the detail will be described later).

Wireless router 210 is externally connected to host PC 110 for receiving a signal from host PC 110 and transmitting the signal to wirelessly connected tablet terminal 190.

Digital cameras 130 are fixed so as to be aligned along frames 150 in the vertical direction. One USB hub 120 is disposed to each of frames 150. In addition, digital camera 130 corresponds one-to-one with a port of USB hub 120. That is, each digital camera 130 is connected to each of ports of USB hub 120 disposed to frame 150 to which it is mounted. A plurality of digital cameras 130 fixed to one frame 150 is defined as one image unit. Image system device 100 has a plurality of image units. A plurality of image units is arranged in an arc shape around an axis parallel to the vertical direction (top-bottom direction of the sheet surface of FIG. 1A) of image system device 100.

Each lamp 140 is supported by frame 150, and disposed near corresponding digital camera 130. Lamp 140 notifies operator 170 or the like of which one of digital cameras 130 is indicated when being lit. That is, the lamp functions as a notification unit capable of notifying operator 170 of the physical location of each digital camera 130.

Frames 150 are linearly formed so as to be parallel to the vertical direction. A horizontal member is disposed to connect one ends (upper ends in FIG. 1A) of frames 150 in the vertical direction, and thus, frames 150 are supported. The horizontal member is disposed on a plane parallel to the horizontal direction. A cross beam bar is disposed at the center of the horizontal member.

Flash lamp 160 is disposed at the center of the cross beam bar formed above frames 150. Flash lamp 160 is installed to emit light upward (toward a ceiling). Subject 200 is irradiated with light reflected from the ceiling.

Speaker 180 is installed on the upper part of a room where frames 150 are installed. Speaker 180 can issue the voice of operator 170, so that operator 170 can give an instruction to a person who is subject 200.

Figure 1B:
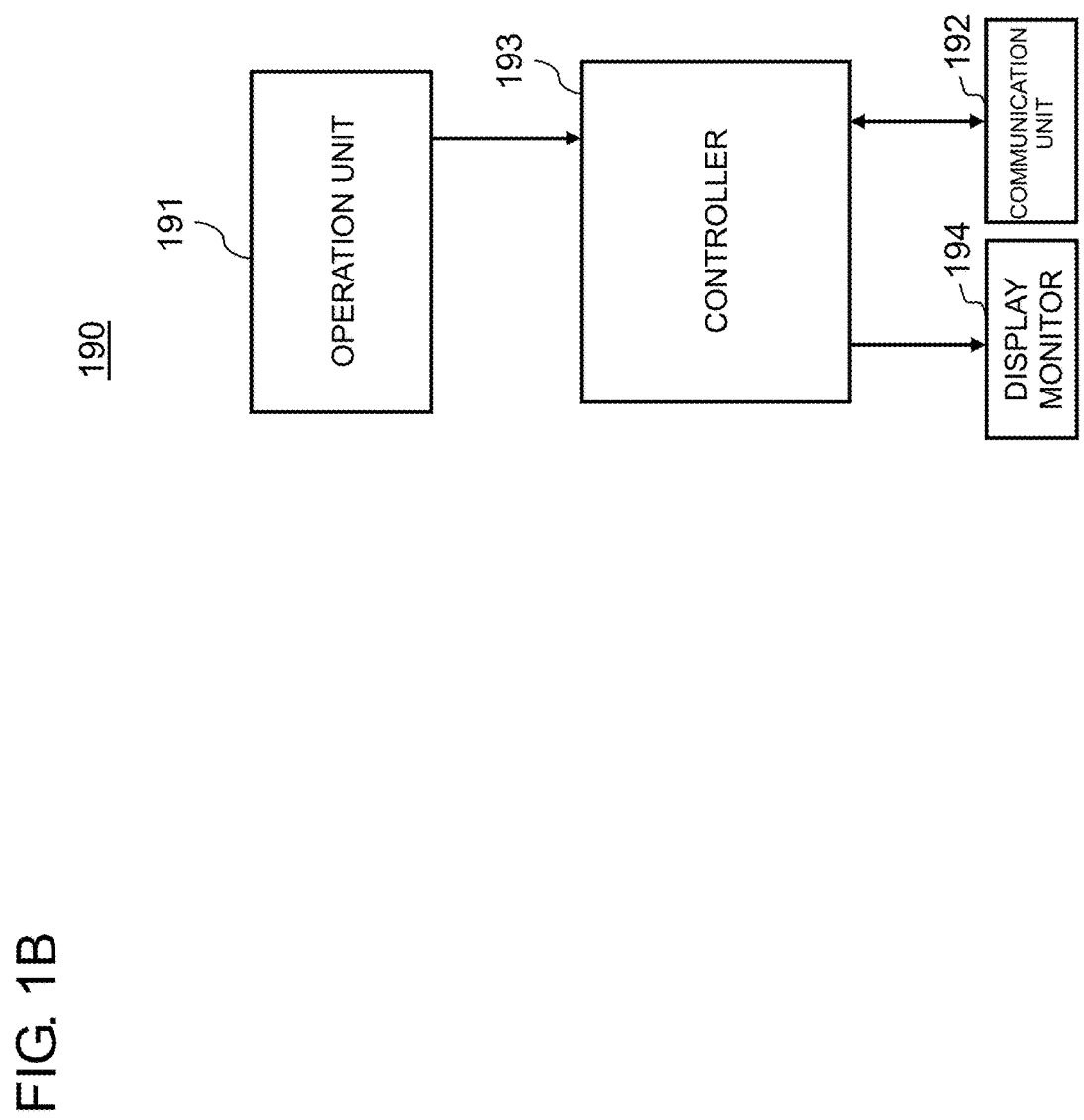
FIG. 1B is a block diagram illustrating a configuration of a tablet terminal according to the first exemplary embodiment.

As illustrated in FIG. 1B, tablet terminal 190 is provided with operation unit 191, communication unit 192, controller 193, and display monitor 194.

Operation unit 191 receives an operation to be performed by operator 170. Operation unit 191 may be a mechanical operation button or a touch panel integrated with display monitor 194.

Communication unit 192 bidirectionally communicates with host PC 110. Communication unit 192 is a communication device capable of infrared communication or wireless communication complying with a Wi-Fi standard or a Bluetooth (registered trademark) standard. According to circumstances, communication unit 192 may be a communication device connected to a router by a local area network (LAN) cable so as to be capable of wired communication with host PC 110. Alternatively, communication unit 192 may be a communication device capable of directly communicating with digital cameras 130 through wireless communication or wired communication.

Controller 193 generates various signals or controls communication performed by communication unit 192. Various signals include a shutter operation signal which is a shooting signal for controlling a shooting timing of digital camera 130. Controller 401 can be achieved by devices, such as a micro-controller, a central processing unit (CPU), a micro processing unit (MPU), a digital signal processor (DSP), an application specific integrated circuit (ASIC), and a field-programmable gate array (FPGA).

Display monitor 194 is a display device such as a liquid crystal monitor or an organic electro luminescence (EL) monitor.

When operator 170 inputs an instruction to capture subject 200 to operation unit 191 of tablet terminal 190, communication unit 192 of tablet terminal 190 transmits the shutter operation signal for digital camera 130 to digital camera 130 through host PC 110 based on the instruction to capture subject 200 received by the operation unit. That is, communication unit 192 of tablet terminal 190 functions as a shooting signal transmitter. Communication unit 192 of tablet terminal 190 also acquires an image from digital camera 130 received by host PC 110. Operator 170 can confirm the image received by communication unit 192 of tablet terminal 190 on display monitor 194 of tablet terminal 190.

Subject 200 is a person or an object, and is a target from which three-dimensional (3D) model data is to be generated.

Operator 170 shoots subject 200 by using tablet terminal 190. Operator 170 confirms that subject 200 is at the center of the system, and can simultaneously click the shutters of all digital cameras 130 at any timing.

In the above description, wireless router 210 is externally connected to host PC 110 in FIG. 1A. However, it may be built into host PC 110.

FIG. 2 is a schematic diagram illustrating a connection configuration between host PC 110 and USB hub 120 according to the first exemplary embodiment. USB hub 1 (HUB 1) and USB hub 2 (HUB 2) are connected to USB connector 220 and USB connector 230 of host PC 110, respectively. The USB hub may be referred to as HUB in some cases below. HUB 1 and HUB 2 respectively have four ports. HUB 11 to HUB 14 of HUB 1 are cascade-connected, and HUB 21 to HUB 24 of HUB 2 are cascade-connected. HUB 11 to HUB 14 and HUB 21 to HUB 24 each have ten ports. Note that FIG. 2 shows that 4-port USB hub HUB 1 is connected to USB connector 220 of host PC 110, and 4-port USB hub HUB 2 is connected to USB connector 230 of host PC 110. When multiple digital cameras 130 are respectively connected to HUB 11 to HUB 14 and HUB 21 to HUB 24 which are 10-port USB hubs, the address information of these digital cameras 130 is individually identified based on the hierarchy information and port number information of USB hub 120. The hierarchy information means information indicating that the first hierarchy shows which one of HUB 1 and HUB 2 is used and the second hierarchy shows which one of HUB 11 to HUB 14 and HUB 21 to HUB 24 is used. Notably, the number of digital cameras 130 to be connected and the connection configuration of USB hub 120 are limited by the standard of the USB, and not limited by the present exemplary embodiment.

In FIG. 2, digital cameras 130 are connected in a two-layer hierarchical structure using USB connectors 220 and 230 of one host PC 110. However, the configuration is not limited thereto, and digital cameras 130 may be connected in a single-layer hierarchical structure using a plurality of host PCs 110. Further, the number of digital cameras 130 to be connected may be increased by using a plurality of host PCs 110.

Figure 3:
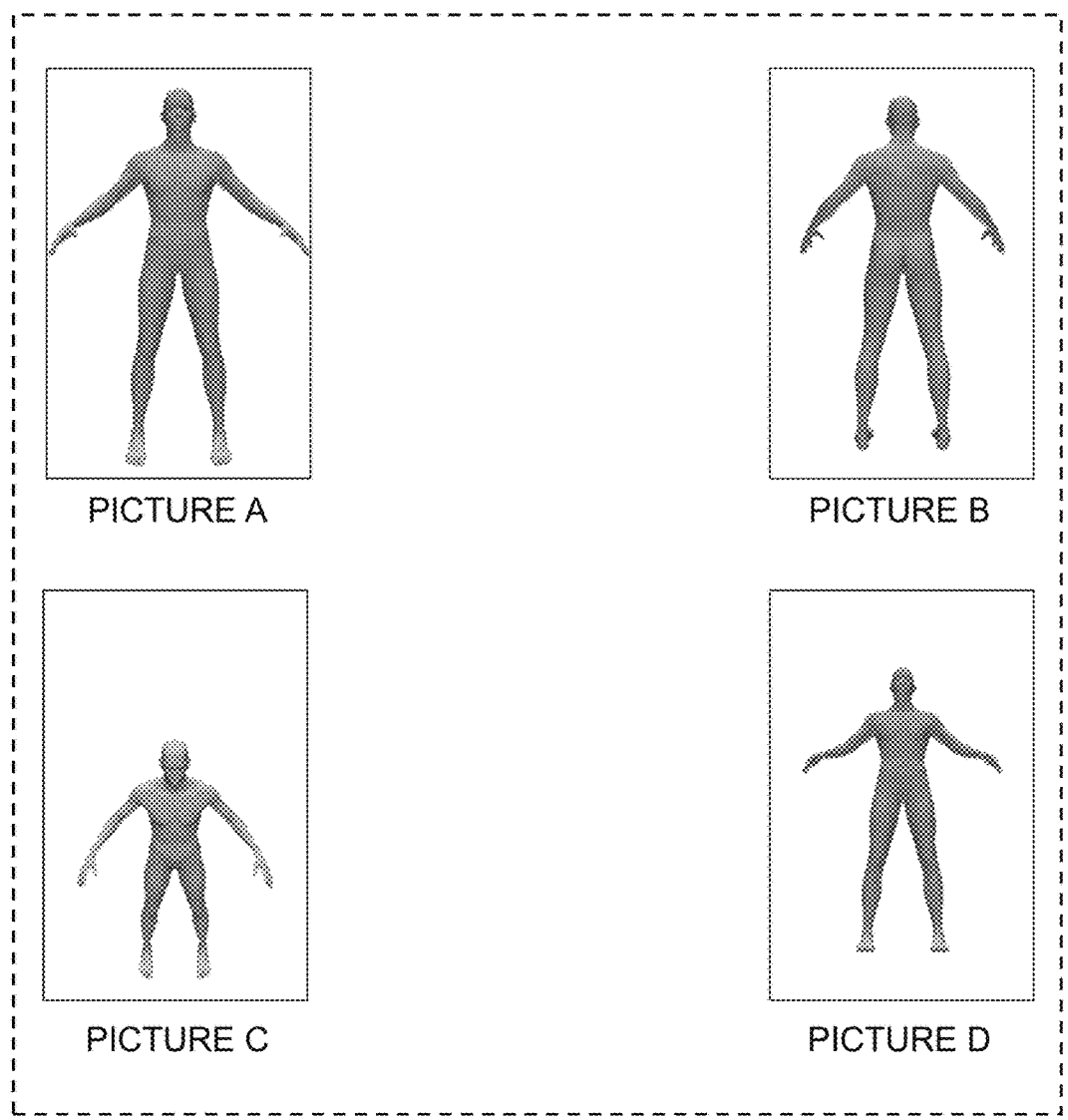
FIG. 3 is a view illustrating one example of captured images that can be acquired by the image system device according to the first exemplary embodiment.

FIG. 3 is a view illustrating one example of captured images that can be acquired by image system device 100 according to the first exemplary embodiment. Picture A is an image captured by digital camera 130 (referred to as digital camera 130A) just in front of subject 200 and at the middle of frame 150. Picture B is an image captured by digital camera 130 (referred to as digital camera 130B) directly opposite to digital camera 130A. Picture C is an image captured by digital camera 130 (referred to as digital camera 130C) located above digital camera 130A. Picture D is an image captured by digital camera 130 (referred to as digital camera 130D) located below digital camera 130A. Digital cameras 130 are disposed around subject 200, so that they can capture subject 200 from various angles. Therefore, by using these captured images, 3D model data can be generated.

An exemplary embodiment of an imaging unit according to the present disclosure will be described below with reference to the drawings.

[1-1-2. Configuration of Digital Camera 130]

Figure 4:
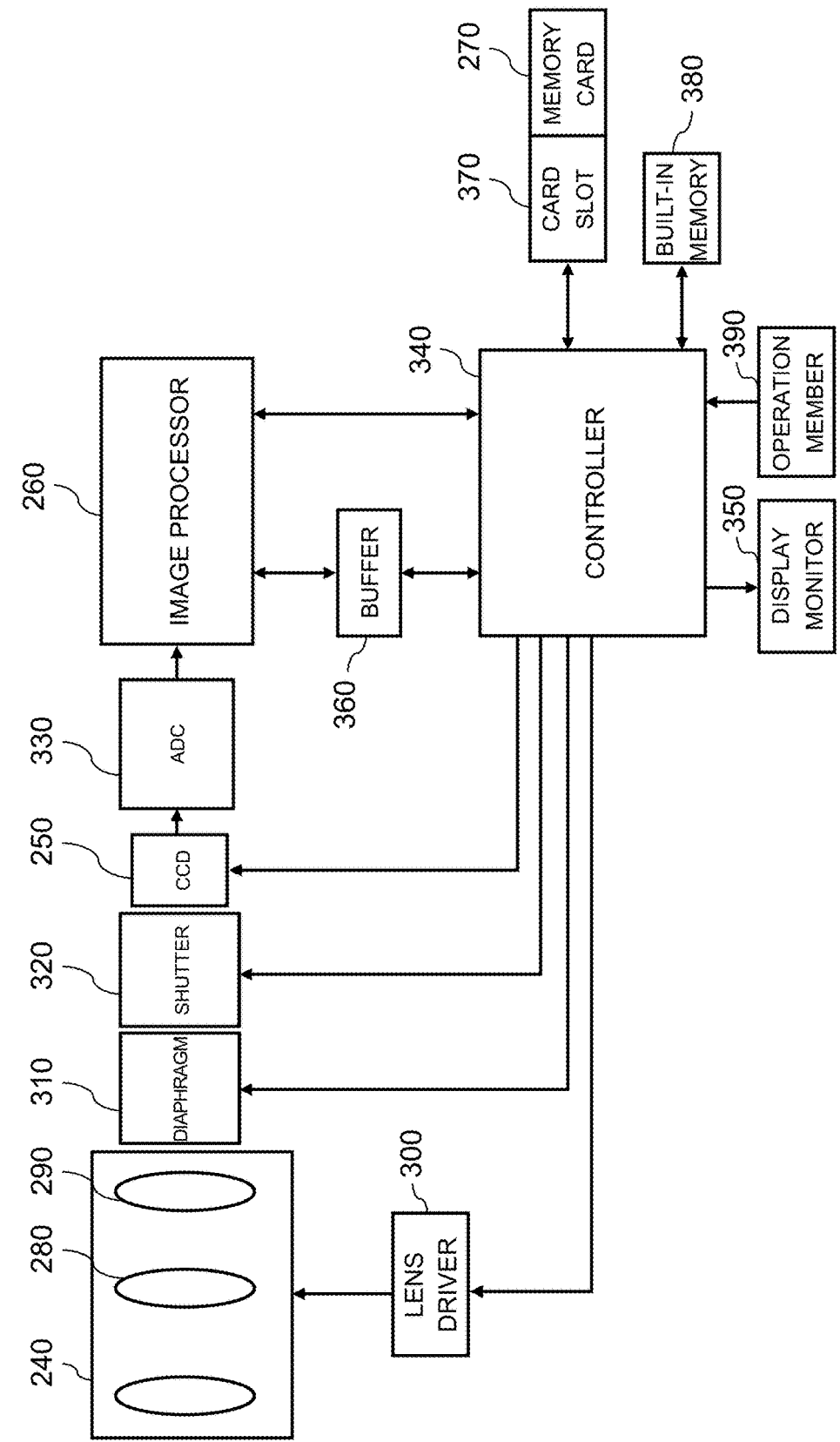
FIG. 4 is a block diagram illustrating a configuration of a digital camera according to the first exemplary embodiment.

FIG. 4 is a block diagram illustrating a configuration of digital camera 130 according to the first exemplary embodiment. An electrical configuration of digital camera 130 according to the first exemplary embodiment will be described with reference to FIG. 4. Digital camera 130 is an imaging device that captures an image of subject 200 formed by optical system 240 including one or more lenses by using charge coupled device (CCD) 250. Image data generated by CCD 250 is subjected to various types of processing by image processor 260 and is then stored in memory card 270. The configuration of digital camera 130 will be described in detail below.

Optical system 240 includes zoom lens 280 and focus lens 290. An image of subject 200 can be enlarged or reduced by moving zoom lens 280 along an optical axis. Furthermore, a focus (an in-focus state) of the image of subject 200 can be adjusted by moving focus lens 290 along the optical axis.

Lens driver 300 drives various lenses (e.g., zoom lens 280 and focus lens 290) included in optical system 240. Lens driver 300 includes, for example, a zoom motor which drives zoom lens 280 and a focus motor which drives focus lens 290.

Diaphragm 310 adjusts a size of an aperture according to a user's setting or automatically to thereby adjust an amount of light transmitting through the aperture.

Shutter 320 is a unit for shielding light to be transmitted to CCD 250. Shutter 320 constitutes an optical system unit that controls optical information indicating the image of subject 200 together with optical system 240 and diaphragm 310. Further, optical system 240 and diaphragm 310 are housed in a lens barrel.

CCD 250 captures the image of subject 200 formed by optical system 240, and generates image data. CCD 250 includes a color filter, a light-receiving element, and an auto gain controller (AGC). The light-receiving element converts an optical signal of light collected by optical system 240 into an electrical signal and generates image information. The AGC amplifies the electrical signal output from the light-receiving element.

Analog-digital converter (A/D converter: ADC) 330 converts analog image data generated by CCD 250 into digital image data.

Based on control of controller 340, image processor 260 performs various types of processing on the digital image data generated by CCD 250 and converted. Image processor 260 generates image data to be displayed on display monitor 350 and generates image data to be stored in memory card 270. For example, image processor 260 performs various types of processing such as Gamma correction, white balance correction, and damage correction, on the image data generated by CCD 250. Furthermore, image processor 260 compresses the image data generated by CCD 250 according to a compression format which complies with H.264 standards or MPEG2 standards. Furthermore, image processor 260 can generate, for example, image data (4K moving image data) of a moving image of approximately 4000×2000 pixels based on the image data generated by CCD 250. Image processor 260 can perform various types of processing described below on the generated 4K moving image data.

Controller 340 is a control unit that entirely controls digital camera 130. Controller 340 can be achieved by a semiconductor element, for example.

Image processor 260 and controller 340 may be configured by hardware alone or may be achieved by a combination of hardware and software. Controller 340 can be achieved by devices, such as a micro-controller, a central processing unit (CPU), a micro processing unit (MPU), a digital signal processor (DSP), an application specific integrated circuit (ASIC), and a field-programmable gate array (FPGA).

Buffer 360 functions as a work memory of image processor 260 and controller 340. Buffer 360 can be achieved by, for example, a dynamic random access memory (DRAM) or a ferroelectric memory.

Card slot 370 is a unit for attachment of memory card 270 to digital camera 130. Card slot 370 can mechanically and electrically connect memory card 270 and digital camera 130.

Memory card 270 includes a flash memory or a ferroelectric memory inside and can store data such as image files generated by image processor 260.

Built-in memory 380 is, for example, a flash memory or a ferroelectric memory. Built-in memory 380 stores a control program for controlling entire digital camera 130, data, and the like.

Operation member 390 is a generic term of a user interface that receives a user's operation. Operation member 390 includes, for example, a button, a lever, a dial, a touch panel, and a switch which receive a user's operation. Furthermore, operation member 390 includes a focus ring disposed on an outer circumference of the lens barrel. The focus ring is a member that is operated to rotate by the user to move focus lens 290.

Display monitor 350 can display an image (a through image) indicated by the image data generated by CCD 250 or an image indicated by image data read from memory card 270. Display monitor 350 can also display various menu screens for making various settings of digital camera 130. Display monitor 350 is configured by a liquid crystal device or an organic electro luminescence (EL) display device.

[1-2. Operation]

An operation of image system device 100 configured as described above will be described below. Image system device 100 performs operations of acquiring location information of digital camera 130, acquiring a captured image, and generating a file name of the captured image based on the location information of digital camera 130. Each of these operations will be described in detail below.

[1-2-1. Acquisition of Location Information of Digital Camera 130]

Figures 5, 6:
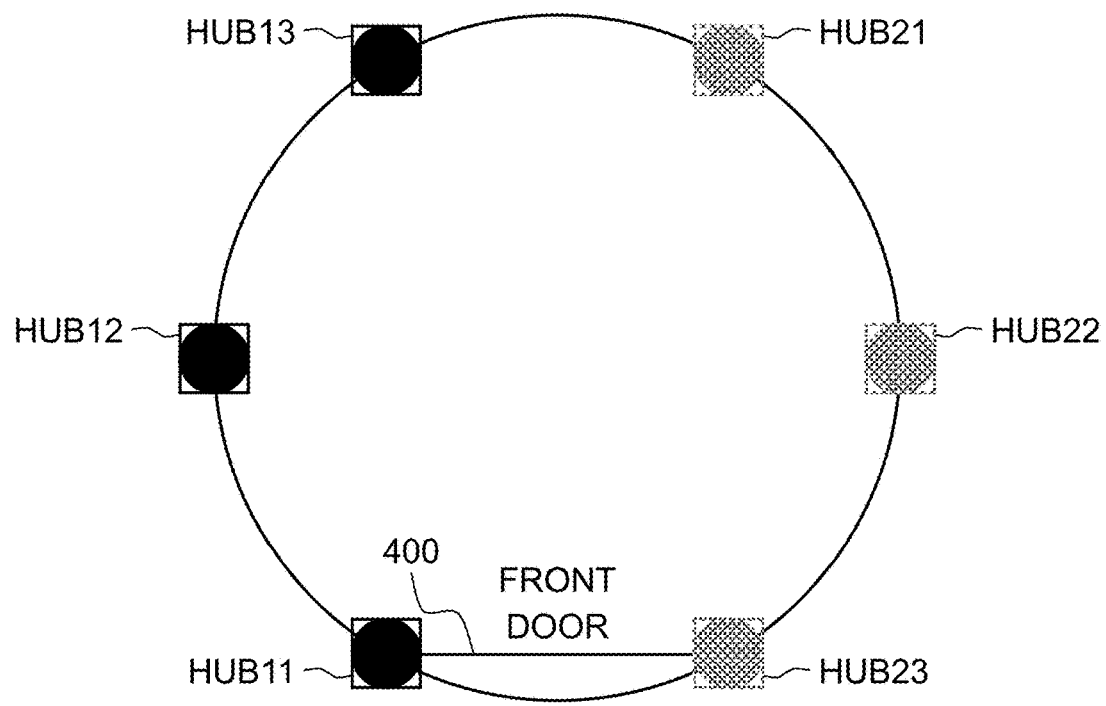
FIG. 5 is a view, as viewed from top, illustrating the configuration of the image system device according to the first exemplary embodiment.
FIG. 6 is a diagram illustrating to which USB hub each of the digital cameras is mounted in the first exemplary embodiment.

FIG. 5 is a view, as viewed from top, illustrating the configuration of image system device 100 according to the first exemplary embodiment. HUB 11, HUB 12, and HUB 13 are connected to same HUB 1 which is a 4-port USB hub, and HUB 21, HUB 22, and HUB 23 are connected to same HUB 2 which is a 4-port USB hub. HUB 11 to HUB 13 and HUB 21 to HUB 23 are aligned on the circumference of a same circle at regular intervals in a top view. Front door 400 for a space in which frames 150 are installed is disposed so as not to interfere with HUB 11 and HUB 23 when opened and closed.

FIG. 6 is a diagram illustrating to which USB hub 120 each digital camera 130 is mounted in the first exemplary embodiment. As illustrated in FIG. 6, the location information of digital camera 130 can be represented as a matrix by associating the physical location of digital camera 130 with the address information (hierarchy information and port number information of USB hub 120). FIG. 1A illustrates that three digital cameras 130 are each mounted to HUB 11 to HUB 13 and HUB 21 to HUB 23 which are 10-port USB hubs. However, FIG. 6 illustrates the relation between the location of each digital camera 130 and address information when six digital cameras 130 are each mounted to HUB 11 to HUB 13 and HUB 21 to HUB 23 which are 10-port USB hubs. The horizontal axis in FIG. 6 indicates to which one of HUB 11 to HUB 13 and HUB 21 to HUB 23 digital camera 130 is mounted. For example, "1-1" on the horizontal axis in FIG. 6 corresponds to HUB 11, "1-2" corresponds to HUB 12, and "1-3" corresponds to HUB 13. "2-1", "2-2", and "2-3" on the horizontal axis correspond respectively to HUB 21, HUB 22, and HUB 23. The vertical axis in FIG. 6 indicates to which port of HUB 11 to HUB 13 and HUB 21 to HUB 23 digital camera 130 is mounted. Ten numbers of 200, 300, 100, 420, 430, 410, . . . are each allocated to the ports of HUB 11 to HUB 13 and HUB 21 to HUB 23.

Figure 7:
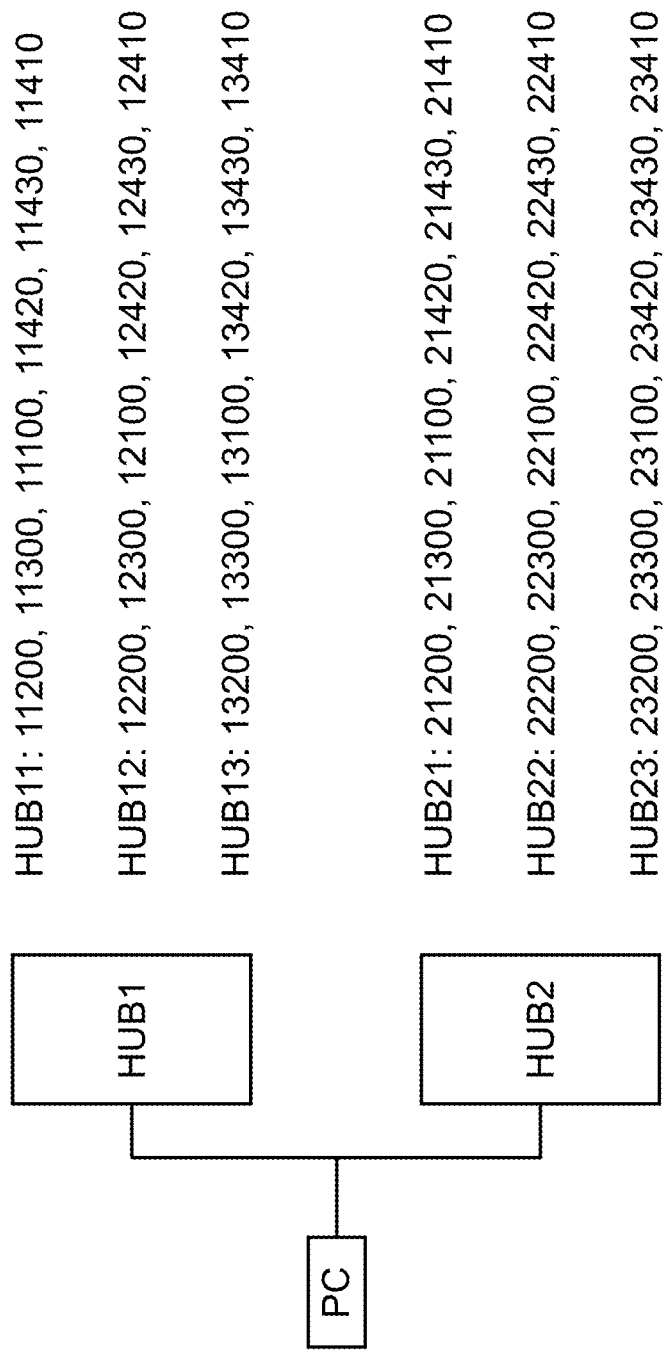
FIG. 7 is a diagram for describing file names of images captured by respective digital cameras in the first exemplary embodiment.

FIG. 7 is a diagram for describing a file name of an image (captured image) captured by each digital camera 130 in the first exemplary embodiment. Note that, as in FIG. 6, FIG. 7 illustrates numbers included in file names of captured images captured by digital cameras 130 when six digital cameras 130 are each mounted to HUB 11 to HUB 13 and HUB 21 to HUB 23. The hierarchy information and port number information of USB hub 120 to which each digital camera 130 is connected can be specified from the numbers illustrated in FIG. 7. For example, if a captured image has a file name including "11200", this image can be specified as an image captured by digital camera 130 connected to port "200" of 10-port USB hub HUB 11. Specifically, a file name indicating the address information of USB hub 120 is given to the captured image transmitted from each digital camera 130, and the resultant captured image is stored in host PC 110. Thus, operator 170 can find which digital camera 130 has transmitted the captured image stored in host PC 110.

Figure 8:
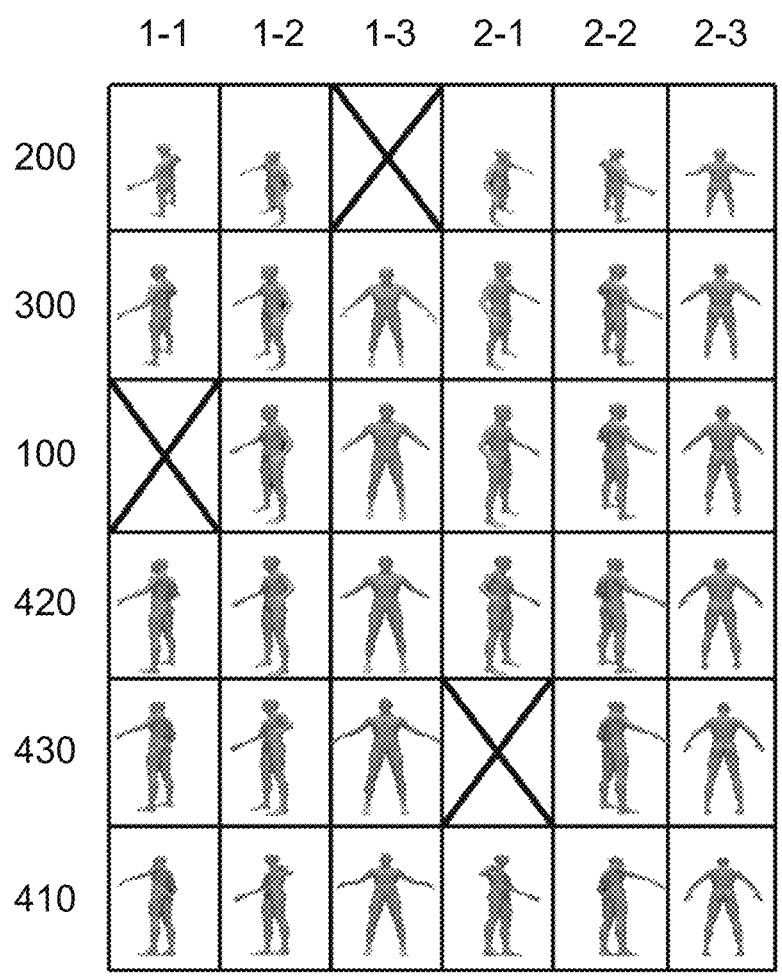
FIG. 8 is a schematic diagram illustrating a list of physical locations of digital cameras and captured images in the first exemplary embodiment.

FIG. 8 is a schematic diagram illustrating a list of physical locations of digital cameras 130 and acquired captured images in the first exemplary embodiment. When acquiring a captured image from digital camera 130, host PC 110 specifies the physical location of digital camera 130 based on the file name indicating the address information of USB hub 120, and newly generates an image (hereinafter referred to as a tile image) in which each captured image is arranged on a tile as illustrated in FIG. 8. Note that each tile is arranged so as to correspond to the physical location of digital camera 130. Operator 170 can confirm the generated tile image on a Web browser of tablet terminal 190. If specific digital camera 130 fails to capture or acquire an image, host PC 110 provides an X mark image on the place where the captured image captured by corresponding digital camera 130 is to be formed, and further generates a text file with the corresponding file name. Therefore, operator 170 can easily specify which digital camera 130 fails to acquire an image only by confirming the generated tile image or confirming a folder in the Web server storing the acquired captured images. Further, the text file contains an error log of corresponding digital camera 130. That is, when opening the text file with a text editor or the like, operator 170 can confirm what kind of error occurs in digital camera 130.

Figure 9:
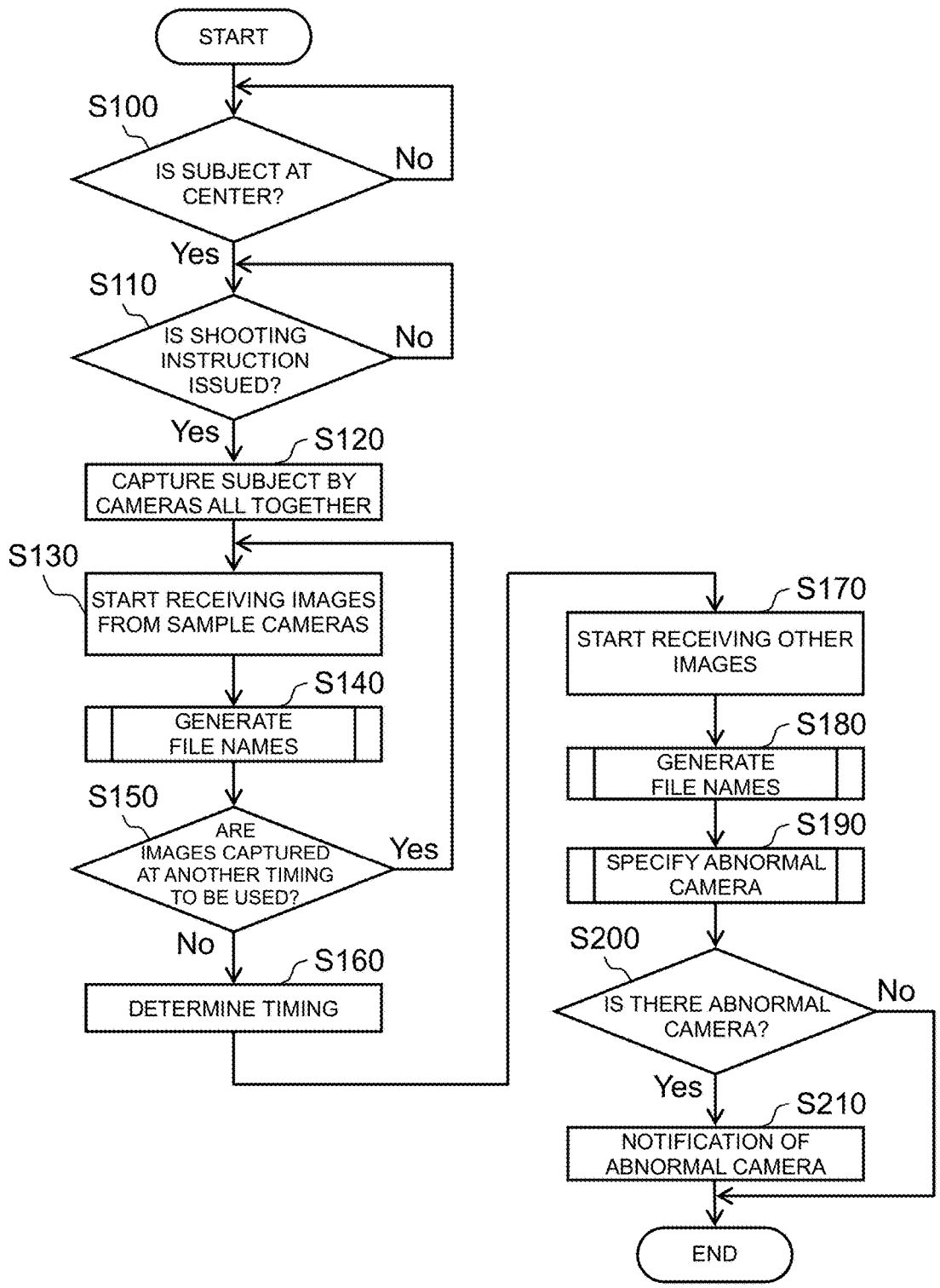
FIG. 9 is a flowchart for describing an operation of the image system device according to the first exemplary embodiment.

FIG. 9 is a flowchart for describing the operation of the image system device 100 according to the first exemplary embodiment.

Operator 170 confirms whether or not subject 200 is at the center of image system device 100 (S100).

When subject 200 is not at the center (No in S100), operator 170 makes adjustment such that subject 200 is at the center, and then, confirms again. For example, operator 170 may give an instruction to subject 200 to move to the center through speaker 180.

When subject 200 is at the center (Yes in S100), tablet terminal 190 confirms whether or not operator 170 instructs host PC 110 to execute shooting by operating tablet terminal 190 (S110).

When determining that operator 170 does not instruct host PC 110 to execute shooting by operating tablet terminal 190 (No in S110), tablet terminal 190 waits until the shooting instruction is issued.

When determining that operator 170 instructs host PC 110 to execute shooting by operating tablet terminal 190 (Yes in S110), tablet terminal 190 transmits a shutter operation signal to all digital cameras 130 based on the shooting instruction. All digital cameras 130 receiving the shutter operation signal simultaneously capture subject 200 all together (S120). It is possible to capture subject 200 more than once in succession.

When the number of digital cameras 130 connected to host PC 110 is large, it takes much time to acquire captured images captured by all digital cameras 130. Therefore, at the beginning, host PC 110 starts receiving captured images from only several digital cameras 130 serving as sample cameras (S130). According to this process, even when image system device 100 provided with a large number of digital cameras 130 is used, captured images for generating 3D model data can quickly be determined.

When acquiring captured images from respective digital cameras 130, host PC 110 generates file names based on the location information of respective digital cameras 130, gives the file names to the corresponding captured images, and stores the resultant captured images (S140).

When shooting is performed more than once, it is confirmed whether or not the captured images captured at the first shooting timing can be used to generate 3D model data (S150). If captured images at another shooting timing are preferable, captured images are acquired again from only several digital cameras 130 serving as sample cameras at another shooting timing (for example, second shooting timing) (Yes in S150).

When it is determined in step S150 that it is unnecessary to acquire captured images at another shooting timing (No in step S150), the timing of captured images to be used is determined (S160). Then, captured images at the determined timing are acquired from all digital cameras 130 except for those used as samples (S170).

When acquiring captured images from respective digital cameras 130, host PC 110 generates file names based on the location information of respective digital cameras 130, gives the file names to the corresponding captured images, and stores the resultant captured images (S180).

After finishing acquisition of captured images from all digital cameras 130, host PC 110 specifies whether or not there is abnormal digital camera 130 (S190).

Next, it is confirmed whether or not abnormal digital camera 130 is specified in step S190 (S200). When abnormal digital camera 130 is specified in step S190 (Yes in S200), host PC 110 notifies operator 170 of which digital camera 130 is abnormal (S210). For example, in the first exemplary embodiment, lamp 140 near abnormal digital camera 130 is lit to notify operator 170 of abnormal digital camera 130.

When abnormal digital camera 130 is not specified in step S190 (No in S200), the process ends.

Figure 10:
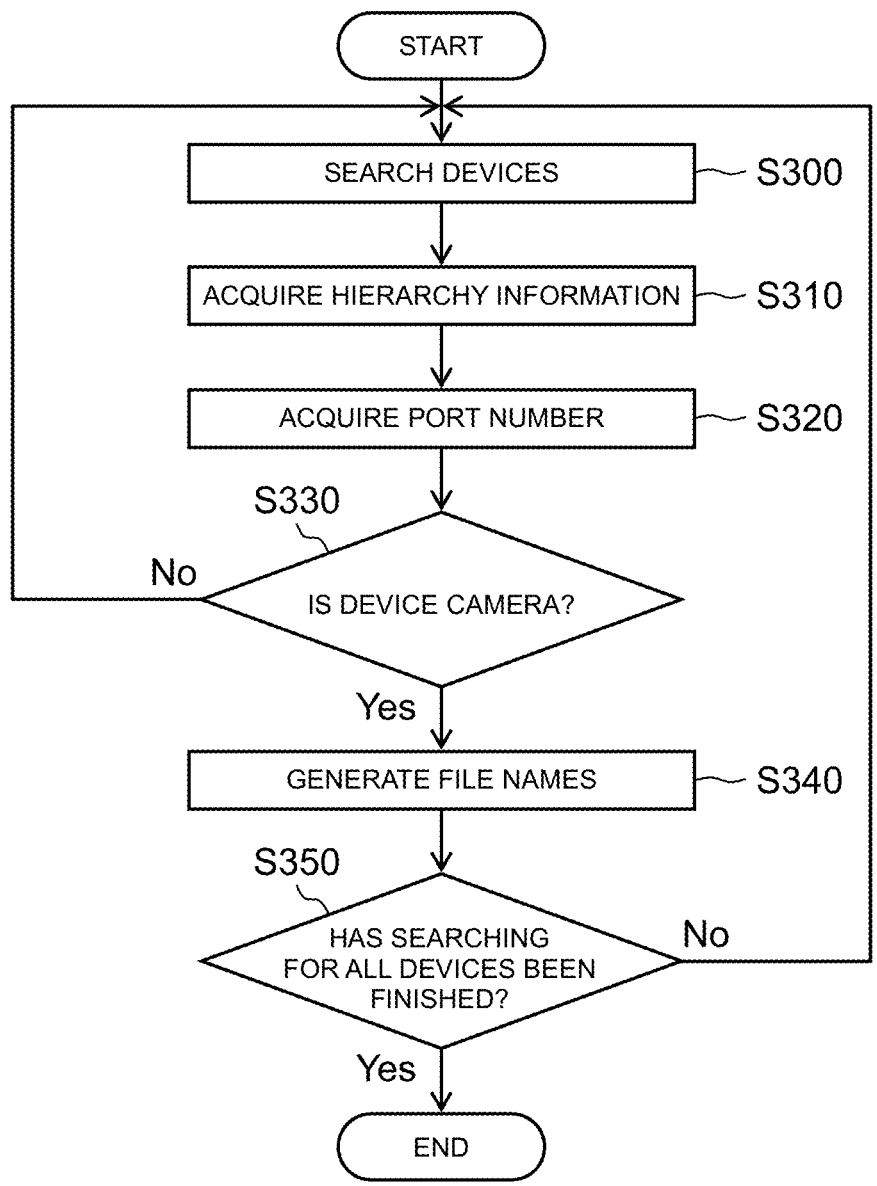
FIG. 10 is a flowchart for describing an operation for generating a file name in the first exemplary embodiment.

FIG. 10 is a flowchart for describing the operation for generating a file name in the first exemplary embodiment. The process for generating a file name will be described in detail with reference to FIG. 10. FIG. 10 is a flowchart illustrating the detailed flow of the process (S140, S180) for generating a file name in FIG. 9.

Host PC 110 sequentially searches all devices which are USB-connected to host PC 110 (S300).

Then, as illustrated in FIG. 6, host PC 110 acquires the hierarchy information of USB hub 120 to which digital camera 130 is connected (S310).

Host PC 110 acquires the port number of USB hub 120 based on the acquired hierarchy information, and holds the acquired port number (S320).

Then, host PC 110 confirms whether or not the connected device is digital camera 130 (S330). If the device is not digital camera 130 (No in S330), the process returns to step S300.

If the device is digital camera 130 (Yes in S330), host PC 110 generates a file name based on the hierarchy information and port number information of USB hub 120 which have been acquired (S340). For example, if the file name to be generated includes the number "12200", the first two digits "12" indicate that digital camera 130 is connected to 10-port USB hub HUB 12 to be connected to USB connector 220 of host PC 110 through the second connector of 4-port USB hub HUB 1. Also, the last three digits "200" indicate that digital camera 130 is connected to the connector with the port number "200" (see FIG. 6).

Host PC 110 determines whether or not searching of all devices is finished (S350), and if not finished (No in S350), returns to step S300. If the searching is finished (Yes in S350), host PC 110 ends the process.

Figure 11:
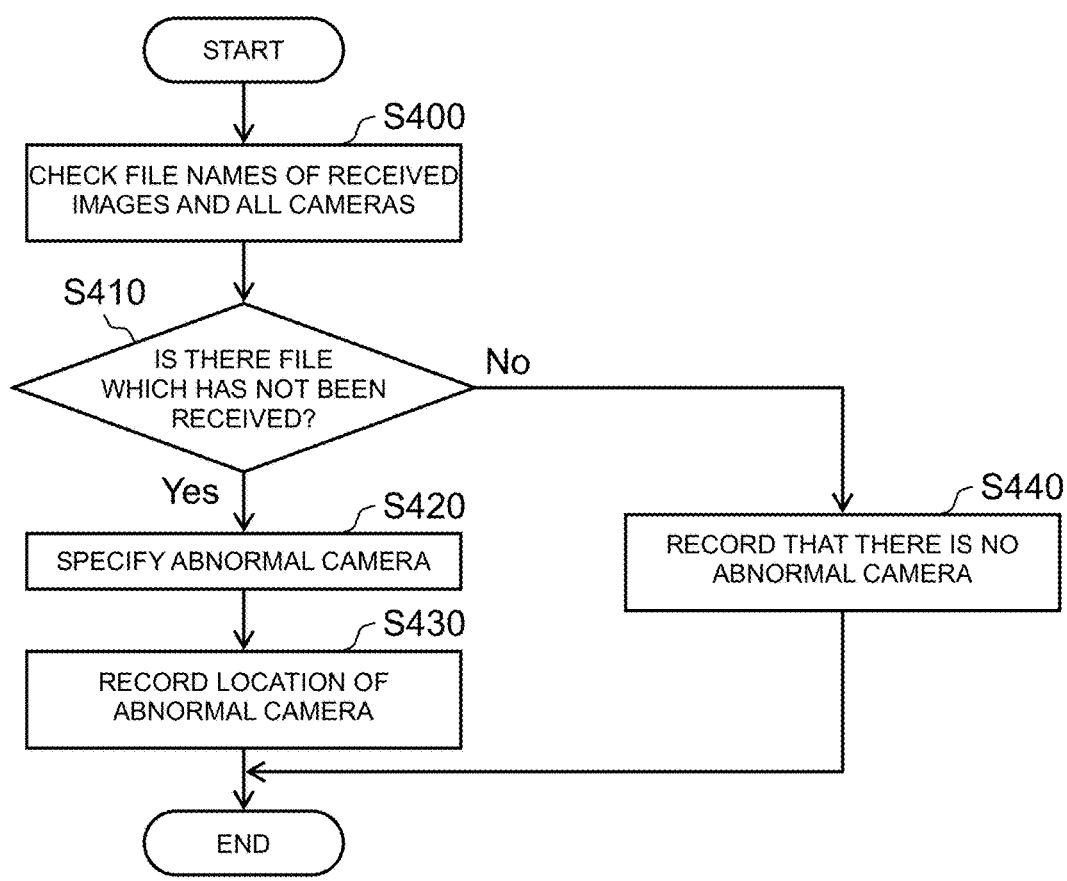
FIG. 11 is a flowchart for describing an operation for specifying a camera that abnormally operates in the first exemplary embodiment.

FIG. 11 is a flowchart for describing an operation for specifying a camera that abnormally operates in the first exemplary embodiment. The process for specifying abnormal digital camera 130 will be described in detail with reference to FIG. 11. FIG. 11 is a flowchart illustrating the detailed flow of the process for specifying an abnormal camera (S190) in FIG. 9.

Host PC 110 checks the file names of the acquired captured images and the location information of all digital cameras 130 (S400). Host PC 110 then confirms whether or not there is a captured image which has not been received (S410). That is, when the file name based on the location information of specific digital camera 130 is not included in the file names of any of the stored captured images, host PC 110 determines that a captured image has not been received from specific digital camera 130, and confirms whether or not there is an image file from digital camera 130 from which a captured image has not been acquired (Yes in S410).

When there is a captured image which has not been acquired (Yes in S410), host PC 110 specifies which digital camera 130 captures this captured image. That is, host PC 110 specifies which digital camera 130 has an abnormality (S420). Then, host PC 100 identifies the physical location of specified digital camera 130 based on the address information of specified digital camera 130, and records the identified location (S430). When there is no captured image which has not been acquired (No in S410), host PC 110 records that there is no abnormal digital camera 130, and ends the process.

[1-3. Effects and Others]

As described above, image system device 100 according to the first exemplary embodiment includes: a plurality of digital cameras 130 that captures specific subject 200 from different directions; a shooting signal transmitter (tablet terminal 190) that transmits, to the plurality of digital cameras 130, a shooting signal for controlling a shooting timing of the plurality of digital cameras 130; and host PC 110 that acquires location information indicating a physical location of each of the plurality of digital cameras 130, and when receiving an image from each of the plurality of digital cameras 130, stores the image with a file name based on the location information corresponding to digital camera 130 from which the image is received.

Specifically, when acquiring images captured by the plurality of digital cameras 130, host PC 110 stores these images with file names based on location information of respective digital cameras 130. Therefore, the correspondence relation between the captured image and digital camera 130 can easily be specified, whereby which digital camera 130 has an abnormality can easily be specified.

Further, in the first exemplary embodiment, the plurality of digital cameras 130 constitutes a plurality of image units circularly arranged in a vertical direction of image system device 100, each of the plurality of image units having a plurality of digital cameras 130 arranged in the vertical direction.

Thus, the physical location of each digital camera 130 and the address information of each digital camera 130 can easily be associated with each other. In addition, the respective digital cameras are arranged in a matrix so as to capture subject 200 from various directions.

Moreover, in the first exemplary embodiment, the image system device further includes a plurality of connection ports connected respectively to the plurality of digital cameras 130, wherein location information is in association with the address information of each of the plurality of connection ports.

Thus, when acquiring images captured by the plurality of digital cameras 130, host PC 110 can generate file names indicating the address information corresponding to the location information based on the location information of respective digital cameras 130 and give the file names to the corresponding images.

In addition, in the first exemplary embodiment, the image system device is provided with lamp 140 as a notification unit. Lamp 140 can notify an operator of the physical location of each of digital cameras 130. When a file name based on the location information of specific digital camera 130 out of the plurality of digital cameras 130 is not included in file names of any images stored in host PC 110, lamp 140 notifies the operator of the physical location of specific digital camera 130.

Thus, operator 170 can easily specify abnormal digital camera 130.

Second Exemplary Embodiment

A second exemplary embodiment will be described below with reference to FIG. 12.

[2-1. Configuration]

Figure 12:
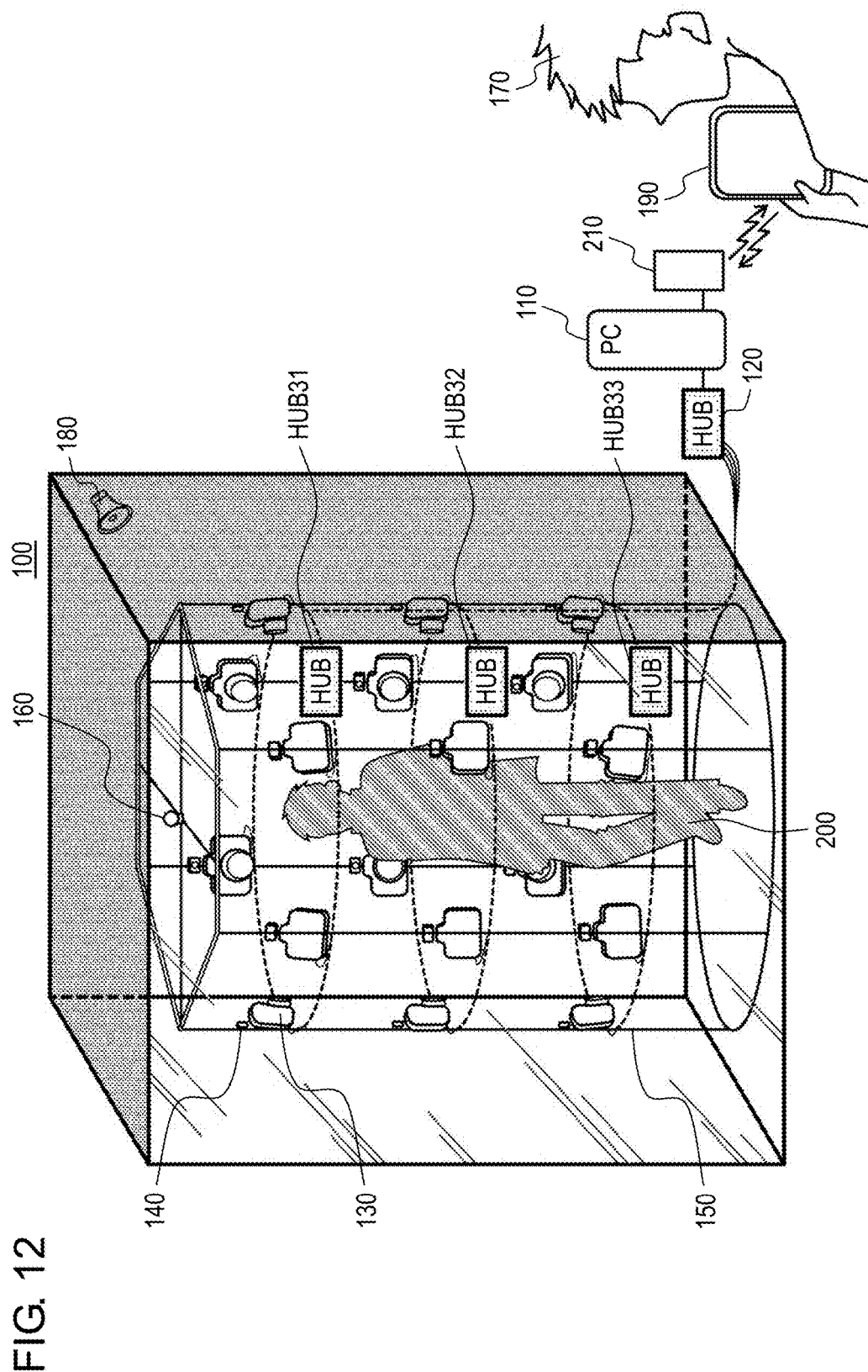
FIG. 12 is a schematic view illustrating a configuration of an image system device according to a second exemplary embodiment.

FIG. 12 is a schematic view illustrating a configuration of image system device 100 according to the second exemplary embodiment. In the second exemplary embodiment, digital cameras 130 on the same horizontal plane are grouped as one image unit. The image system device according to the second exemplary embodiment is constituted by three image units. Each image unit is connected to each of 10-port USB hubs HUB 31 to HUB 33.

[2-2. Operation]

As in the first exemplary embodiment, image system device 100 according to the second exemplary embodiment generates a file name of an image captured by digital camera 130 based on the location information of digital camera 130. That is, the file name indicates the address information (hierarchy information and port number information) of digital camera 130 that captures the image. Host PC 110 checks the file name of the acquired captured image and the location information (address information) of the digital camera. When determining that there is a captured image which has not been acquired, host PC 110 specifies corresponding digital camera 130 based on the file name thereof. If determining that specified digital camera 130 is abnormal, host PC 110 provides notification.

[2-3. Effects and Others]

As described above, image system device 100 according to the second exemplary embodiment also includes a plurality of digital cameras 130, tablet terminal 190 serving as a shooting signal transmitter, and host PC 110 that acquires location information of digital camera 130, and stores a captured image with a file name based on the location information, as in the first exemplary embodiment.

Therefore, the correspondence relation between the captured image and digital camera 130 can easily be specified, whereby which digital camera 130 has an abnormality can easily be specified.

In addition, in the second exemplary embodiment, the plurality of digital cameras 130 is grouped such that some digital cameras 130 on the same horizontal plane form one group. Therefore, the correspondence relation between the captured image and digital camera 130 can easily be specified, whereby which digital camera 130 has an abnormality can easily be specified.

In FIG. 12, digital cameras 130 are connected in a two-layer hierarchical structure using USB connectors 220 and 230 of one host PC 110. However, the configuration is not limited thereto, and a plurality of host PCs 110 may be used.

Other Exemplary Embodiments

In the above exemplary embodiments, location information indicating the physical location of digital camera 130 is associated with address information (hierarchy information and port number information) of the USB hub. However, the location information may be associated with global positioning system (GPS) information, for example. That is, each digital camera 130 is provided with a GPS receiver, and gives GPS information to the data of the captured image. Host PC 110 acquires the location information of each digital camera 130 in advance, and can associate the location information with the GPS information. Therefore, when acquiring a captured image from digital camera 130, host PC 110 can specify the physical location of digital camera 130 based on the GPS information included in the captured image. This makes it easier to specify digital camera 130. In addition, host PC 110 may generate a file name indicating the GPS information, give this file name to a captured image, and store the resultant captured image. Thus, digital camera 130 which fails to transmit an image can easily be specified.

In the above exemplary embodiments, when there is abnormal digital camera 130, lamp 140 is used to notify operator 170 of abnormal digital camera 130. However, before providing this notification, host PC 110 may reset USB hub 120 and reconnect USB hub 120 to digital camera 130.

In the above exemplary embodiments, lamp 140 is used as the notification unit. However, the notification unit is not limited to lamp 140. For example, the notification unit may be a single light source such as a laser pointer. This light source provides notification to operator 170 by irradiating target digital camera 130 with a light beam. In addition, host PC 110 or tablet terminal 190 itself may be configured to function as the notification unit such that a display monitor of host PC 110 or tablet terminal 190 can display target digital camera 130. Furthermore, the notification unit may be configured as a speaker to notify the operator of the physical location of the digital camera by sound. Speaker 180 illustrated in FIG. 1A may also be used as the speaker serving as the notification unit, or the speaker serving as the notification unit may be separately provided.

In addition, the above exemplary embodiments describe that the communication unit of tablet terminal 190 functions as the shooting signal transmitter and outputs a shooting signal (shutter operation signal) for controlling the shooting timing of the plurality of digital cameras 130. However, the shooting signal transmitter is not limited to the communication unit of tablet terminal 190. A communication unit of host PC 110 or a communication unit of another terminal connectable to host PC 110 or digital camera 130 may be used as the shooting signal transmitter, and the shooting timing of each digital camera 130 may be controlled by outputting a shooting signal from the communication unit of the other terminal or host PC 110. Alternatively, a shutter device externally provided to each digital camera 130 may be used as the shooting signal transmitter. Specifically, operator 170 may directly operate the shutter device of each digital camera 130 to control the shooting timing of each digital camera 130.

In addition, while host PC 110 is used as the host in the above exemplary embodiments, the host itself may be a portable tablet terminal.

Furthermore, while operator 170 operates host PC 110 by using tablet terminal 190 in the above exemplary embodiments, host PC 110 may be configured to be directly operable by operator 170.

Further, while a portable plate-shaped computer is supposed to be used as tablet terminal 190 in the description of the above exemplary embodiments, a so-called notebook-size personal computer (PC) can also be used instead. In addition, while a digital camera is described as the imaging unit in the above exemplary embodiments, the imaging unit is not limited to the digital camera. An imaging device having a function other than a camera function, such as a camera-equipped smartphone or tablet terminal, can be used as the imaging unit, so long as it has an imaging function.

The first and second exemplary embodiments have been described above as illustrations of the technique disclosed in the present application. However, the technique in the present disclosure is not limited thereto, and can also be applied to exemplary embodiments subjected to modification, substitution, addition, omission and the like. In addition, a new exemplary embodiment can be made by combining constituents described in the above first and second exemplary embodiments.

Further, since the above exemplary embodiments illustrate the technique in the present disclosure, various modifications, substitutions, additions and omissions can be made within the scope of claims and the scope of equivalents thereof.

The present disclosure is applicable to a device that captures a specific subject by using a plurality of digital cameras. Specifically, the present disclosure is applicable to, for example, a system that generates data useful for 3D modeling by using a plurality of digital cameras.

What is claimed is:

1. An image system device comprising:
   a plurality of imaging units that captures a specific subject from different directions;
   a shooting signal transmitter that transmits, to the plurality of imaging units, a shooting signal for controlling a capturing timing of the plurality of imaging units;
   a host that acquires location information indicating a physical location of each of the plurality of imaging units, and when receiving an image from each of the plurality of imaging units, stores the image with a file name based on the location information corresponding to each of the imaging units from which the image is received; and
   a notification unit that is able to notify an operator of the location of each of the plurality of imaging units, wherein, when the file name based on the location information of a specific imaging unit out of the plurality of imaging units is not included in the file names of any of the images stored in the host, the notification unit notifies the operator of the location of the specific imaging unit.

2. The image system device according to claim 1, including image units, wherein
   each of the image units includes one or more of the plurality of imaging units,
   the image units are arranged in an arc shape around an axis parallel to a vertical direction of the image system device,
   the one or more of the plurality of imaging units is aligned in the vertical direction.

3. The image system device according to claim 2, further comprising
   a plurality of connection ports connected respectively to the plurality of imaging units, wherein the location information is in association with address information of each of the plurality of connection ports.

* * * * *